United States Patent [19]

Khurana

[11] Patent Number: 4,674,927
[45] Date of Patent: Jun. 23, 1987

[54] TELESCOPING NOSE PIECE

[75] Inventor: Sudershan K. Khurana, Marietta, Ga.

[73] Assignee: Lockheed Corporation, Calabasas, Calif.

[21] Appl. No.: 681,669

[22] Filed: Dec. 14, 1984

Related U.S. Application Data

[63] Continuation-in-part of Ser. No. 648,074, Sep. 7, 1984.

[51] Int. Cl.$^4$ .......................................... B23Q 11/06
[52] U.S. Cl. ..................................... 408/56; 408/110; 408/241 G; 409/134
[58] Field of Search ............... 408/56, 84, 110, 241 R, 408/241 G, 710, 57, 58, 59, 60, 61, 67; 279/76, 80; 409/134; 51/272, 273; 83/100; 29/DIG. 56, DIG. 86; 144/251 A, 252 R; 74/609, 612

[56] References Cited

U.S. PATENT DOCUMENTS

| | | | |
|---|---|---|---|
| 1,386,687 | 8/1921 | Chase | 408/110 |
| 1,414,110 | 4/1922 | Bocchio | 279/80 X |
| 2,339,324 | 1/1944 | Fischer | 408/58 X |
| 2,382,639 | 8/1945 | Kennard | 408/84 |
| 2,462,386 | 2/1949 | Griffin | 408/115 X |
| 2,987,334 | 6/1961 | Wendling | 279/76 |
| 3,776,647 | 12/1973 | Hart | 408/241 G |
| 4,037,982 | 7/1977 | Clement | 408/61 |
| 4,200,417 | 4/1980 | Hager et al. | 408/241 G X |
| 4,290,717 | 9/1981 | Aslen | 408/241 G |

FOREIGN PATENT DOCUMENTS

| | | | |
|---|---|---|---|
| 484717 | 5/1938 | United Kingdom | 408/241 G |
| 547285 | 12/1945 | United Kingdom | 408/241 G |
| 581875 | 10/1946 | United Kingdom | 408/110 |
| 2096030 | 10/1982 | United Kingdom | 408/58 |

OTHER PUBLICATIONS

United Drill Bushing Corp., Catalog, vol. 6, (Jan. 1, 1979), p. 175.

Primary Examiner—Gil Weidenfeld
Assistant Examiner—G. L. Webb
Attorney, Agent, or Firm—Vangelis Economou; Eric R. Katz; Stanley L. Tate

[57] ABSTRACT

Disclosed is a nose piece for a power drill and hand drill with certain modifications made to nose piece and using telescopic bushing having a drill motor, a drill spindle and a drill bit attached to the spindle, the nose piece being capable of macro longitudinal adjustment with respect to the length of the drill bit and rotational adjustment of its position with respect to the drill motor and the work piece.

12 Claims, 1 Drawing Figure

TELESCOPING NOSE PIECE
CROSS REFERENCE TO RELATED APPLICATION

This application is a continuation-in-part of copending application Ser. No. 648,074, filed Sept. 7, 1984.

TECHNICAL FIELD

This invention relates in general to generating holes in a work piece, and in particular, to an accessory to a power drill for generating holes of a predetermined depth and diameter and in a predetermined pattern on the work piece.

BACKGROUND ART

In the past, power drills have been used to produce holes in a work piece. Also, in the past, accessories known as nose pieces have been used with power drills to fasten the drill into a drill jig or similar positioning device so that a hole produced would be properly positioned on the work piece. Also, nose pieces served to protect the drill bit from damage and by providing support when bushing mounted on it and to provide a conduit to carry coolant to the drill bit and to guide it to the point on the work piece being drilled. In the past, however, when it was necessary to change the length of the drill bit being used, a specific nose piece was required because there was no nose piece with an adjustable length dimension available. Thus, it was necessary to keep a tool inventory which included a nose piece for each drill bit length. Additionally, the radial relationship between the nose piece coolant port and the work piece being drilled could only be changed by disassembling the drill and nose piece and reassembling them by shimming between nose piece and power drill to achieve correct positioning of coolant port position with respect to work piece with the nose piece being assembled and disassembled and the shimming process continued until proper positioning is achieved. This requires that an inventory of specially designed shims be carried. Such a method is time consuming and costly because of the large tool inventory required for each drill and drill bit, especially when changing drill bits after drilling every few holes.

Thus, it can readily be seen that the prior art nose piece accessories available for use with power drills do not deal with the problems of length and angular adjustment of the accessory with respect to the drill bit and with respect to the part being drilled.

DISCLOSURE OF THE INVENTION

Accordingly, it is an object of the present invention to provide a nose piece accessory for a power drill that can be adjusted lengthwise with respect to the drill bit which is installed on the drill.

It is also an object of the present invention to provide a nose piece accessory for a power drill that can be rotated about the axis of the drill bit installed in the drill so that the radial position of coolant ports and chip windows included in the nose piece can be changed with respect to the drill bit and the work piece without detaching the nose piece from the drill motor and without any need for shims.

The principal feature of the present invention is the provision of a unique nose piece accessory for a power drill which can be used with a variety of drill lengths whereas in accordance with current practice nose pieces having specific length dimensions are required for use with drill bits of specific lengths. In accordance with the present invention a nose piece is provided for a power drill which when attached to the drill and positioned in a drill jig properly positions the drill with respect to a piece being drilled. The nose piece is in the form of a generally cylindrical first housing which encloses the drill spindle and a drill bit attached thereto; a complementary extensible housing nested within the first housing so that a macro variable relationship is created between the linear and radial position of the first housing, the drill bit and the work piece; and means for attaching the first housing to the drill motor; bushing means connected on one end to the extensible housing and on the opposite end to a drill jig so that the entire assembly is positioned with respect to a work piece and so that the drill bit must pass through the bushing to contact the work piece; and a means for fixing the linear and radial positions of the housing with respect to the drill bit and the work piece.

An additional feature of the present invention is the ability of the assembled nose piece to have coolant injected therein so that the coolant flows around the drill bit and onto the work piece.

Still another feature of the present invention is the ability of the nose piece to convey chips and dust away from the drill site during drilling.

Another feature of the present invention is the ability of the nose piece to accept interchangeable lock collar with bushings without being detached from the drill motor.

Yet another feature of the present invention is the ability of the nose piece to accommodate drill bits of various diameters merely by changing a lock bushing which forms a part of the bushing means.

An additional feature of the present invention is the capability of the nose piece to be firmly but removably secured to a drill jig or template which is attached to the work piece.

An important advantage of the present invention is the dual capability of the nose piece to be adjusted in length and angular relationship with respect to the drill bit and bushing length used and work piece being drilled.

In accordance with these and other objects, features and advantages of the present invention, there is provided a nose piece for a power drill, the power drill having a drill motor, a drill spindle, and a drill bit attached to the spindle which comprises a generally cylindrical first housing which encloses the drill bit and drill spindle; a means for attaching the housing to the drill motor and varying both the linear and radial relationships between the housing, the drill bit and the drill motor; bushing means connected on one end to the first housing and on the opposite end to a drill jig so that the drill bit must pass through the bushing means to contact a work piece; and means for adjusting and fixing the linear and radial positions of the housing with respect to the drill bit, the work piece and the drill motor.

Also in accordance with the present invention the means for adjusting and fixing the linear and radial positions of the housing with respect to the drill bit, the work piece and the drill motor comprises a complementary extensible housing nested within the first housing and bearing a first linear array of indicia extending along the housing to form graduations which are parallel to the long axis of the housings and at least one complementary indicia located on the first housing for alignment with an indicia from the linear array so that the relative positions of the nose piece, the drill bit and the work piece can be determined and fixed.

In accordance with the present invention the means for adjusting the linear and radial positions of the extensible housing with respect to the drill bit, drill motor and work piece also comprise a second linear array of indicia offset from the first linear array and extending along the housing to form a second set of graduations parallel to the long axis of the nose piece and those indicia which comprise the second linear array of indicia bisect the corresponding graduations from the first array of indicia which form the first set of graduations.

Also in accordance with the present invention the means for adjusting and fixing the linear and radial positions of the nose piece with respect to the drill bit, the work piece and the drill motor comprises n linear arrays containing m indicia which extend parallel along the exterior of the extensible housing to form n sets of graduations parallel to the long axis of the nose piece so that the overall length of the nose piece can be accurately determined.

Further, in accordance with the present invention the means for securing the extensible housing in a fixed position with respect to the first housing, the drill motor, the drill bit and the work piece comprises a first hole extending frm the outer surface of the first housing to the inner surface of the same housing which receives a keeper and brings the keeper into contact with the exterior surface of the extensible housing so that when the keeper engages the extensible housing and thus the nose piece is retained in a fixed position with respect to the drill motor, the drill bit and the work piece.

In accordance with the present invention the keeper comprises a flush socket head screw. The extensible housing when secured with screws in first housing is subject to minimal deformation and distortion thereby providing maximum accuracy on bushing end of assembly.

Also in accordance with the present invention a covering means is provided to protect the keeper from accidental movement.

In accordance with the present invention the covering means comprises an annular groove in the outer surface of the first housing, the annular groove including that portion of the outer surface of the first housing through which the first hole is drilled, and a snap ring which rests in the annular groove so that the hole and the keeper in the hole are covered.

In accordance with the present invention the first housing further comprises a coolant entry port so that coolant can be injected into the nose piece and made to flow around the drill bit.

In accordance with the present invention the first housing further comprises chip windows cut into the sides of the housing so that chips and dust can be removed from the area being drilled.

In accordance with the present invention the first housing further includes means for mounting the bushing means within the end of the housing that is opposite the second housing.

In accordance with the present invention the bushing means comprises a radial bushing and a complementary lock bushing the diameter of which is determined by the diameter of the drill bit being used.

In accordance with the present invention the bushing means further includes means for delivering coolant to the drill bit and the work piece at the point of contact between the drill bit and the work piece.

In accordance with the present invention close tolerance on radial and longitudinal dimensions between outer and extensible housings provide concentricity and smooth rotational and longitudinal movements when adjusted.

These and other objects, features and advantages of the present invention will become more readily apparent with a reading of the following more detailed description of the preferred embodiment in conjunction with the accompanying drawings and claims. The drawings in which like reference characters indicate corresponding parts in all views are not necessarily to scale, emphasis instead being placed on illustrating the principles of the invention.

BEST MODE OF CARRYING OUT THE INVENTION

Figure 1:
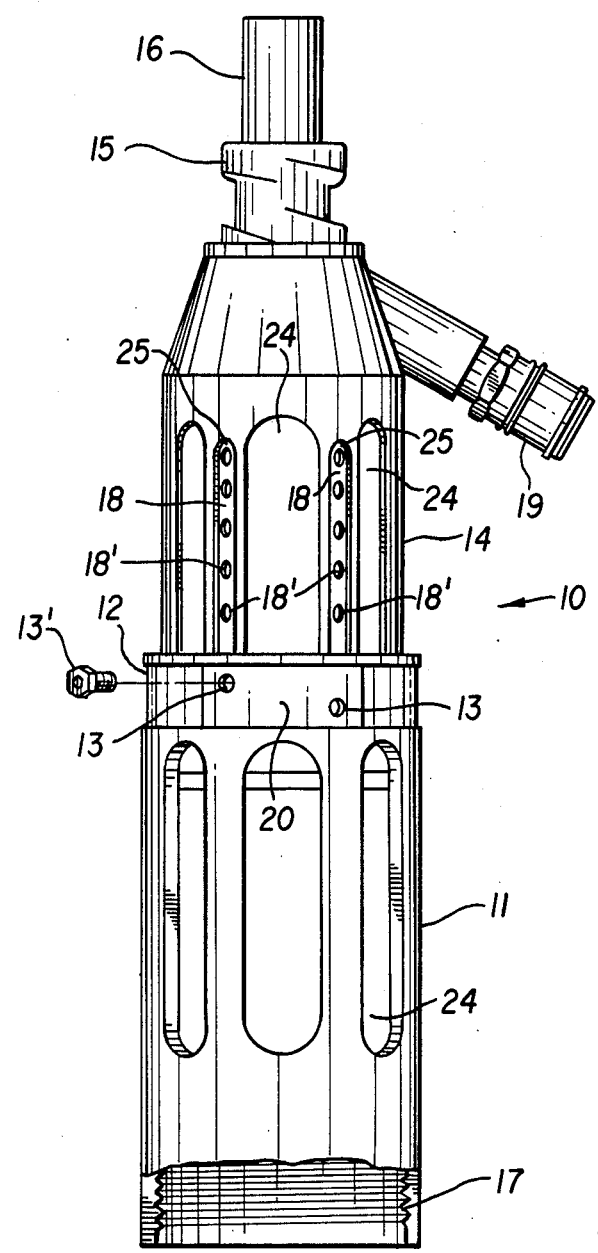
FIG. 1 is a side elevational view of the nose piece of the present invention.

Referring now to FIG. 1 a nose piece 10 includes a first housing 11, a snap ring 12, first and second holes 13 flush socket head screw keeper 13', complementary extensible housing 14, a lock collar 15, drill bushing 16, coolant inlet and motor mount threads 17. Nose piece 10 is an accessory for a power drill, the drill having a drill motor with a drill spindle and a drill bit attached to the spindle (all not shown). When assembled, nose piece 10 attaches to the drill motor by means of threads 17 on the interior motor end of first housing 11. The coupling of nose piece 10 and the drill motor is done in such a way that the drill spindle and any attached drill bit project into and through the central bore of nose piece 10. Extensible housing 14 nests within first housing 11, which has internal threads 17 along a portion of its length. Annular ring 20 is cut into first housing 11 around the end opposite of threads 17 and snap ring 12 nests therein to cover holes 13 and keepers 13' positioned in holes 13 so that first housing 11 can be boxed against extensible housing 14 to fix the length and radial orientation of nose piece 10. When the housing 14 is properly adjusted with respect to the length of the drill bit and the angular position of coolant port 19 with respect to the work piece, a keeper is inserted through either one of holes 13 to engage a corresponding hole 18' in n linear arrays indicia 18. Snap ring retainer band 12 is then put into place to protect keepers. When this is accomplished the linear and angular position of the nose piece is fixed until a change is made necessary by the shape of the work piece or length of the drill bit and nose piece 10 is locked into a drill jig.

Drill bushing 16 screws into the internally threaded end of lock collar 15 which screws into an internally threaded end of extensible housing 14. Drill bushing 16 is channeled so that coolant can flow directly from coolant port 19 and be carried directly to the drill bit and the point of its contact with the work piece. Coolant port 19 is also internally threaded to accept a fitting to facilitate the introduction of coolant into nose piece 10. Chips, dust and other by-products of drilling are removed from the area being drilled by the helical motion of the drill flutes and expelled from the nose piece through chip windows 24. Housing 14 has had flats 25 machined into them to recess the individual elements of linear arrays 18.

Although the present invention has been discussed and described with primary emphasis on one preferred embodiment, it should be obvious that adaptations and modifications can be made thereto without departing from the spirit and scope of the invention.

I claim:

1. A nose peice for a power drill, said drill having a drill motor, a drill spindle and a drill bit attached to said drill spindle comprising:
    (a) a first housing for enclosing both said drill bit and said drill spindle;
    (b) means for attaching and securing in a fixed position said first housing to said drill motor;
    (c) an extensible second housing, nested within said first housing in a complementary, concentric, and rotatable relationship thereto, for creating a macro variable relationship both in the longitudinal and rotational positions between said extensible second housing with respect to both said first housing and said drill bit at predetermined, selected, fixed positions;
    (d) coolant means for cooling a workpiece with coolant while work is being performed thereon; and
    (e) exiting means for permitting the removal of chips, dust and excess coolant from said Y workpiece through both said first housing and said extensible second housing;
    (f) means for adjusting the longitudinal and rotational positions of said extensible second housing with respect to both said first housing and said drill bit, said means including a first linear array of indicia extending along said extensible second housing to form a set of graduations parallel to the longitudinal axis of said extensible second housing and said first housing, at least one complementary indicia positioned on said first housing for alignment with an indicia from said linear array so that the relative positions of said extensible second housing and said drill bit can be determined and fixed in relation to said workpiece; and
    (g) means for securing said extensible second housing in said predetermined, selected, fixed positions with respect to both said first housing and said drill bit.

2. The nose piece of claim 1, wherein said means for adjusting said longitudinal and rotational positions of said extensible second housing further comprises a second linear array of indicia offset from said first linear array and extending along said extensible second housing to form a second set of graduations parallel to the longitudinal axis of said housings wherein the indicia which comprise said second linear array bisect the corresponding graduations which form said first set of graduations.

3. The nose piece of claim 1, wherein said means for adjusting said longitudinal and rotational positions of said extensible second housing comprises n linear arrays containing m indicia, where n and m are whole number integers, said arrays extending parallel along the exterior of said extensible second housing to form n sets of graduations parallel to the long axis of said housings so that the overall length of said nose piece can be accurately determined.

4. The nose piece of claim 1, wherein said means for securing said extensible second housing in said predetermined, selected fixed positions comprises a first hole extending from the outer surface of said first housing to the inner surface thereof and adapted to receive and bring a keeper into contact with the exterior surface of said extensible second housing so that when said keeper engages said extensible second housing, said extensible second housing is retained in a fixed position with respect to both said first housing and said drill bit.

5. The nose piece of claim 4 wherein said keeper comprises a flush socket head screw.

6. The nose piece of claim 4 further comprising means for covering said keeper and protecting said keeper from accidental movement so that only intentional movement of said extensible second housing is possible.

7. The nose piece of claim 6 wherein said covering means comprises an annular groove in the outer surface of said first housing and including that portion of said outer surface through which said hole and said keeper extend and a snap ring nesting in said annular groove so that said hole and said keeper are covered.

8. The nose piece of claim 4 wherein said means for securing said extensible second housing in said predetermined, selected fixed positions further comprises at least one additional hole extending from the outer surface of said first housing to the inner surface thereof said additional hole being offset longitudinally and rotationally from said first hole.

9. The nose piece of claim 1 wherein said coolant means comprises a coolant entry port positioned on said extensible second housing so that coolant can be injected into said nose piece and made to flow around said drill bit.

10. The nose piece of claim 1 wherein said exiting means comprises at least one chip window cut in the respective sides of both said first housing and said extensible second housing so that chips, dust and excess coolant can be removed from the workpiece.

11. The nose piece of claim 1 wherein said extensible second housing further includes drill bushing means and means for mounting said bushing means within said extensible second housing.

12. The nose piece of claim 11 wherein said bushing means comprises a reducer bushing and a complementary lock bushing, the dimensions of which are determined by the diameter of the drill bit being used.

* * * * *

UNITED STATES PATENT AND TRADEMARK OFFICE
CERTIFICATE OF CORRECTION

PATENT NO. : 4,674,927
DATED : June 23, 1987
INVENTOR(S) : SUDERSHAN K. KHURANA

It is certified that error appears in the above—identified patent and that said Letters Patent is hereby corrected as shown below.

Item [73] on the Title Page should refer to the Assignee:

Lockheed Corporation, Calabasas, Calif.

Signed and Sealed this

Third Day of November, 1987

*Attest:*

DONALD J. QUIGG

*Attesting Officer*    *Commissioner of Patents and Trademarks*